United States Patent [19]

Spence et al.

[11] Patent Number: 5,730,824
[45] Date of Patent: Mar. 24, 1998

[54] METHOD OF EXTRUDING AND BONDING BIODEGRADABLE STRUCTURED PACKING

[75] Inventors: Orville Spence, Arlington, Tex.; Beth C. Tormey, Frenchtown, N.J.

[73] Assignees: American Excelsior Company, Arlington, Tex.; National Starch & Chemical Investment Holding Corporation, Wilmington, Del.

[21] Appl. No.: 677,780

[22] Filed: Jul. 10, 1996

Related U.S. Application Data

[63] Continuation of Ser. No. 337,685, Nov. 10, 1994, abandoned.

[51] Int. Cl.[6] .............................. B29C 47/00; B32B 9/02
[52] U.S. Cl. .................. 156/244.19; 156/244.24; 156/244.27; 156/308.8
[58] Field of Search ................ 156/244.11, 244.19, 156/244.24, 244.27, 308.6, 308.8, 336, 244.18; 264/51, 148, 53; 206/523, 584, 585, 586, 814; 106/210

[56] References Cited

U.S. PATENT DOCUMENTS

| | | |
|---|---|---|
| 2,215,849 | 9/1940 | Bauer .................................. 106/210 |
| 3,780,929 | 12/1973 | Terrasi ................................. 206/586 |
| 4,355,073 | 10/1982 | Knightley ............................ 156/308.8 |
| 4,851,286 | 7/1989 | Maurice ............................... 206/523 |
| 4,863,655 | 9/1989 | Lacourse et al. . |
| 5,035,930 | 7/1991 | Lacourse et al. . |
| 5,043,196 | 8/1991 | Lacourse et al. . |
| 5,116,550 | 5/1992 | Perkins . |
| 5,272,181 | 12/1993 | Boehmer et al. . |
| 5,286,769 | 2/1994 | Eden et al. ........................... 156/336 |

*Primary Examiner*—Richard Crispino
*Attorney, Agent, or Firm*—Jenkens & Gilchrist, P.C.; J. Kevin Gray

[57] ABSTRACT

A biodegradable structured packing formed from laminated layers of biodegradable filler. The filler is formed from a starch base and extruded into sheets. The surfaces of the sheets are treated with a substance such as water to promote tackification and bonding and pressed together to form a laminate assembly. The laminate assembly may then be used as is or then cut to any of a variety of shapes for packing and related purposes.

5 Claims, 2 Drawing Sheets

5,730,824

METHOD OF EXTRUDING AND BONDING BIODEGRADABLE STRUCTURED PACKING

This application is a continuation of application Ser. No. 08/337,685, filed on Nov. 10, 1994, now abandoned.

BACKGROUND OF THE INVENTION

1. Field of the Invention

The present invention relates to packing materials and, more particularly, to a laminated, biodegradable, structured packing assembly.

2. History of Related Art

Disposable packing has been used for decades for protecting fragile articles such as glassware, electronic equipment, and related items during shipping and bulk handling. The type of packing material has also evolved over the years. Packing materials for protecting fragile articles have included wood shavings in form of wood wool or "excelsior," old newspapers and more technologically innovative synthetic materials such as polystyrene.

Two distinct forms of packing have found widespread popularity: structured packing and random packing. Widely used random packing includes loose fill packing (peanuts) formed of expanded polystyrene beads and the like. Conventional, widely used structured packing likewise includes expanded polystyrene blocks, planks and cubes often cut to shape and/or molded to precisely fit fragile equipment and/or structures. In many instances, such packing is extruded into the most desirable shape and, due to the nature of expanded polystyrene, comprises a very useful and effective packing substance. Disadvantages exist for both structured and random packing of the expanded polystyrene variety. These disadvantages comprise, in the most part, the non-biodegradable nature of polystyrene. Polystyrene is derived from petroleum and has a long half-life (up to 1,000 years). A recent innovation in random packing has been the use of starch as a base material for the fabrication of such packing. Aspects of this technology are set forth and shown in U.S. Pat. Nos. 5,043,196, 5,035,930 and 4,863,655, which teach the use of extruded starch-based and particularly high amylose starch packing materials such as loose fill packing. The loose fill packing is resilient and affords the user many of the same advantages as polystyrene. The key advantage is the biodegradability of such starch-based, loose fill packing.

It would also be an advantage to provide the positive aspects of starch-based, packing for general packing applications requiring structured packing. Structured packing is often provided in blocks that are cut into particular shapes and/or sizes for insertion into boxes around delicate equipment. In many instances, structure packing is formed in specific shapes that are most efficient in packing applications. In some instances, the packing materials themselves may be used in applications other than packing thus leading to environmental concerns. Biodegradability and repulpability would thus be significant design aspects. The present invention provides such an improvement over the prior art by providing a method of and apparatus for producing biodegradable structured packing for use in structured packing applications.

SUMMARY OF THE INVENTION

The present invention relates to packing materials of the biodegradable variety. More particularly, one aspect of the present invention comprises a method of making a biodegradable structured expanded foam packing including the steps of providing a starch component for forming biodegradable foam, providing an extruder and then heating, mixing and extruding the biodegradable foam into sheets. The sheets are then treated to initiate tackification of surfaces thereof. Two or more treated sheets are assembled one atop the other for bonding into a laminate which may be cut into structured packing configurations, as necessary.

In another aspect, the above described invention includes the step of stacking the treated sheets one against the other and compressing them to enhance bonding therebetween. The step of treating the surfaces of the sheets comprises the step of spraying an aqueous substance onto the sheets to create a bonding surface. In one embodiment the substance sprayed onto the sheets comprises water which initiates tackification.

In another aspect, the present invention includes a method of manufacturing a biodegradable structured expanded foam packing. The method comprises the steps of providing raw materials for extruding biodegradable foam, extruding sheets of the biodegradable foam from the raw materials, treating surfaces of the sheets to initiate temporary, limited softening or tackification to facilitate bonding of one sheet to another, and stacking the sheets one against the other with the treated surfaces therebetween for the bonding thereof into a laminate. The laminate may then be cut or shaped into different structured packing configurations, as needed. The stacked configuration may also be used without cutting or shaping.

In another aspect, the present invention includes apparatus for manufacturing a biodegradable structured foam packing comprising means for supplying raw materials and extruding sheets of biodegradable foam. Means are provided for treating the sheets and stacking them together. In this manner, the sheets are bonded into a laminate. Means may be provided for cutting or shaping the laminate into structured packing configurations.

BRIEF DESCRIPTION OF THE DRAWINGS

For a more complete understanding of the present invention and for further objects and advantages thereof, reference may now be had to the following description taken in conjunction with the accompanying drawings in which:

FIG. 2 is an enlarged, fragmentary exploded perspective view of the laminate packing of FIG. 1 illustrating the bonding of layers there between;

DETAILED DESCRIPTION

Figure 1:
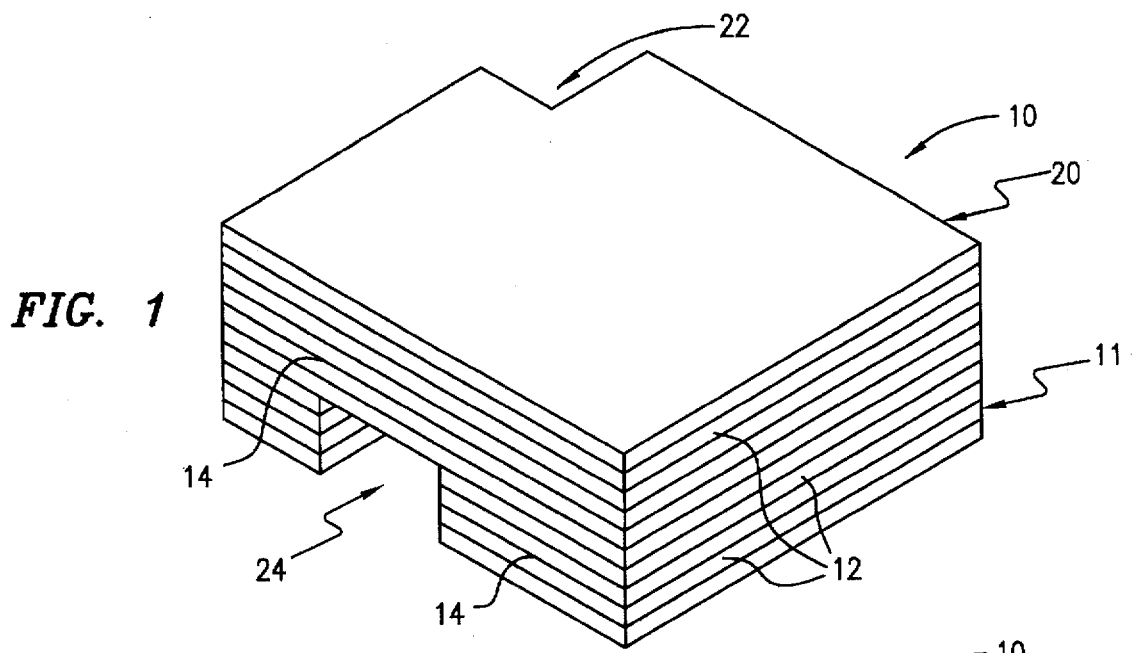
FIG. 1 is a perspective view of a laminate packing assembly constructed in accordance to the principles of the present invention.

Referring first to FIG. 1, there is shown a perspective view of a biodegradable, laminated packing assembly 10 constructed in accordance with the principles of the present invention. The packing 10 is of the structured packing variety which may be cut and shaped into a configuration 11 specifically adapted for a particular packing application. In the present invention, the packing 10 comprises a variety of layers 12 with bonded portions 14 there between. The bonded portions 14 are comprised of partially softened and tackified regions of the layers 12, as will be described in more detail below.

Still referring to FIG. 1, the packing assembly 10, as illustrated herein, is shown in configuration 11 for purposes of illustration only. The configuration 11 comprises, for example, a generally rectangular shape 20, which shape includes a corner cut-out 22 and a central slotted portion 24 cut therethrough. These shapes illustrate a few of the many cutting angles that are possible for select packing configurations. Other packing materials can, of course, be cut into such shapes for the shipment of electronic equipment, glass ware, and other fragile items. The packing 10 of the present invention also provides biodegradability with packing having similar cushioning features.

Figure 2:
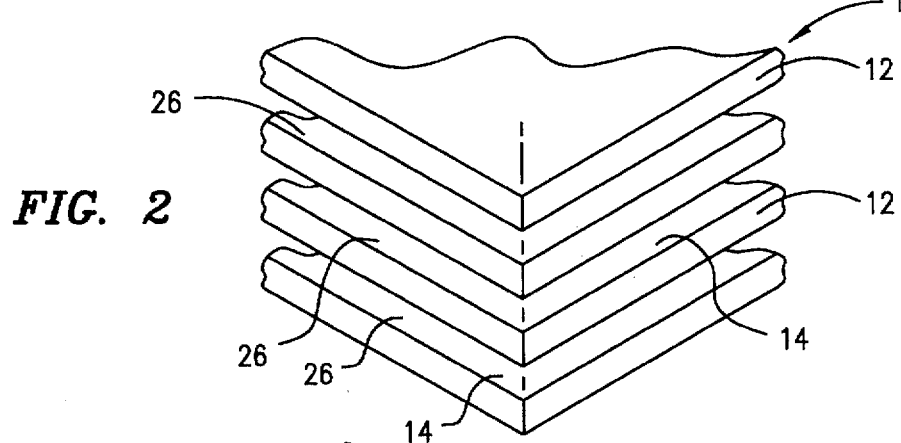

Referring now to FIG. 2 there is shown an enlarged, fragmentary exploded perspective view of a section of the laminant packing assembly 10 of FIG. 1. The layers 12 are separately formed, cut to size, and placed against each other as shown herein for bonding thereto. The bonded portions 14 are formed by the application of a select material (such as water) onto a surface 26 of each of the layers 12. The treatment for the surface 26 initiates tackification of the surface, creating a soft, tacky region to facilitate bonding thereof. Other substances, including adhesives may, in certain applications, be incorporated.

Referring still to FIG. 2, the treating substance which may be applied to the surface 26 includes water. An aqueous solution may also be used, more particularly an aqueous polysaccharide dispersion having up to 50% and preferably 0 to 30% by weight solids content. The polysaccharide used may include materials such as starch, dextrin, maltodextrin, pyrodextrin, sugar, etc. The use of water or an aqueous solution is effective in providing the degree of tackability needed to laminate starch articles because of the nature of starch. However, this would not be true with synthetic or plastic materials in general. Once tackification has been initiated, the surface will then fuse to the surface of an adjacent layer 12 compressed thereagainst.

The starting starch material useful in this invention may be any of several starches, native or converted. Such starches include those derived from any plant source including corn, potato, wheat, rice, sago, tapioca, waxy maize, sorghum and high amylose corn, etc. Starch flours may also be used as a starch source. Also included are the conversion products derived from any of the former bases including, for example, dextrins prepared by hydrolytic action of acid and/or heat; oxidized starches prepared by treatment with oxidants such as sodium hypochlorite; fluidity or thin boiling starches prepared by enzyme conversion or mild acid hydrolysis; and derivatized and cross-linked starches. The starches include high amylose starches, i.e., those containing 40% or more by weight and preferably 65% or more by weight of amylose. Also included are unmodified or modified starches. Modified starches are those derivatized or modified by typical processes known in the art, e.g., esterification, etherification, oxidation, acid hydrolysis, cross-linking and enzyme conversion. One particularly usefully starch modification is the etherification with alkylene oxide (2 to 6 carbon atoms and up to 15% by weight of the alkaline oxide). Additive compounds such as polyvinylalcohol and polyvinylacetate may also be used.

Figure 3:
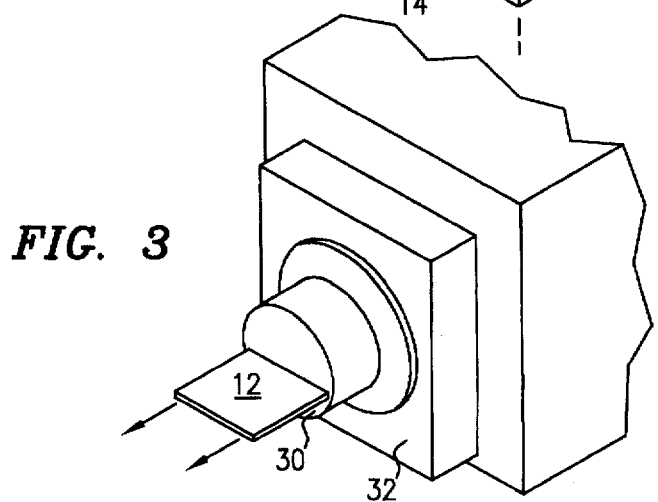
FIG. 3 is a perspective view of the fabrication of a sheet of packing material of the type used in the assembly of FIG. 2.

Referring now to FIG. 3 there is shown a perspective view of a fabrication of a sheet of packing material of the type used in the packing assembly 10 of FIG. 2. The sheet or layer 12 is shown emerging from an extruder head 30 formed adjacent a conventional extruder 32. The extruder 32 may be of conventional manufacture and of the type generally utilized for extruding biodegradable products.

Extrusion is a conventional, well-known technique used in many applications for processing plastics and has been used to a lesser or limited extent in processing food starches. As set forth in the above-referenced U.S. Pat. No. 5,043,196, assigned to one of the assignees of the present invention, control of the temperature along the length of the extruder barrel is important and is controlled in zones along the length of the screw. Heat exchange means, typically a passage, such as a channel, chamber or bore located in the barrel wall, for circulating a heated media such as oil, or an electrical heater such as calrod or coil type heaters, is often used. Additionally, heat exchange means may also be placed in or along the shaft of the screw device.

Variations in any of the elements used in the extruder may be made as desired in accordance with conventional design practices in the field. A further description of extrusion and typical design variations can be found in "Encyclopedia of Polymer Science and Engineering", Vol. 6. 1986. pp. 571 to 631. A specifically configured extruder head 30 will, of course, be necessary to form the elongate cross-sectional configuration of the sheets 12, as shown which extruder head shape may vary depending on particular sheet size requirements and product applications.

Figure 4:
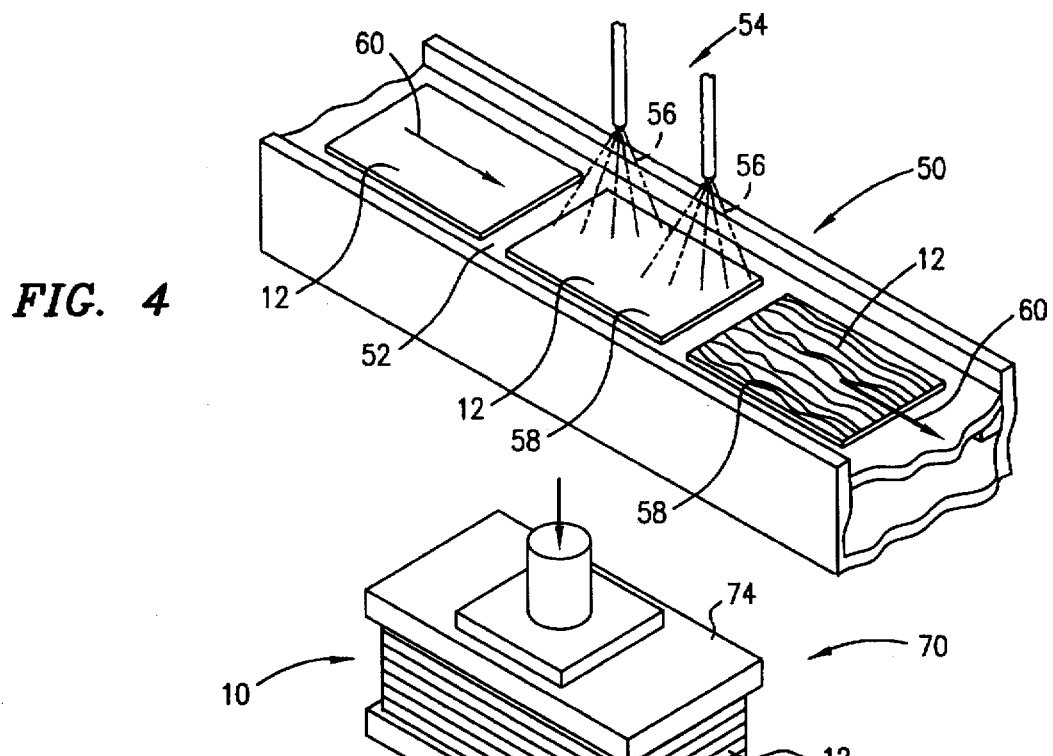
FIG. 4 is a perspective view of one step in the manufacturing process of the present invention.

Referring now to FIG. 4 there is shown a diagrammatical illustration of an assembly line 50. A plurality of sheets 12 are placed on a conveyor belt 52. A spray head assembly 54 is shown discharging liquid 56 onto a surface 58 of each layer 12. The spray head assembly 54 may discharge an aqueous solution such as water or the like in a spray or mist pattern of sufficient quantity to initiate softening and tackification of the surface 58 of the layers 12, as described above. The softening of the surface 58 will cause it to become sticky and have an affinity for an adjacent surface of similar material. The conveyor belt 52 advances in the direction of arrows 60 and to a location for subsequent assembly as described in more detail below.

Figure 5:
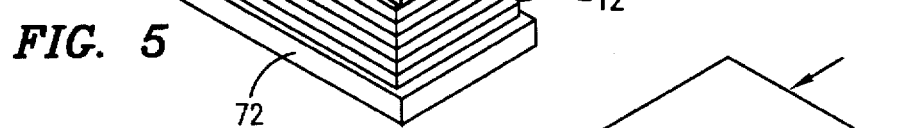
FIG. 5 is a perspective view of another step in the manufacturing process of the present invention.

Referring now to FIG. 5 there is shown a diagrammatic illustration of the stacking of the layers 12 within a stacking and compression device 70. The device 70 may comprise a base member 72 and moveable frame 74 for compressing the multiple treated layers 12 therebetween. Each of the treated layers 12 is thus compressed against the other to further promote the bonding therebetween and to make the surfaces meet evenly without gaps.

Figure 6:
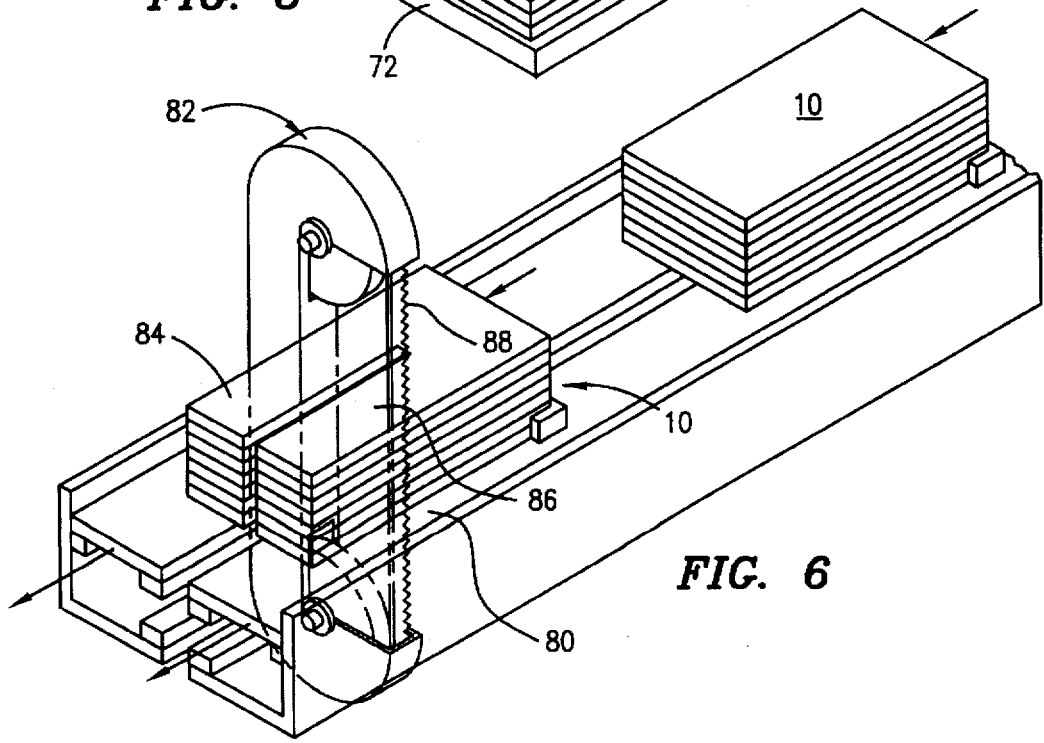
FIG. 6 is a perspective view of another step in the manufacturing process of the present invention.

Referring now to FIG. 6 there is shown a diagrammatic illustration of another step which may be necessary in the manufacturing process of the present invention. Laminate assemblies 10 are shown positioned on a band saw conveyor 80 in which a band saw 82 is shown cutting or separating two assembly blocks 84 and 86. A single band saw 88 is shown for purposes of illustration only. A variety of cutting or shaping techniques could be utilized in accordance with the principles of the present invention. For example, another particularly suitable technique for forming or shaping the laminate assembly or an individual piece is die cutting or shaping. It is to be noted here that the integrity of the foamed or expanded starch material and particularly its cellular structure as well as its strength and other structural characteristics make it suitable for shaping and configuring in this manner.

It is thus believed that the operation and construction of the present invention will be apparent from the foregoing description. While the method and apparatus shown or described has been characterized as being preferred it will be obvious that various changes and modifications may be made therein without departing from the spirit and scope of the invention as defined in the following claims.

What is claimed is:

1. A method of making a biodegradable structured foam packing comprising the steps of:

providing a starch component for forming biodegradable foam;

providing an extruder for heating, mixing and extruding said biodegradable foam from said component;

extruding sheets of biodegradable foam with said extruder;

misting surface portions of said sheets with a sufficient quantity of a moisturizing fluid consisting essentially of water to initiate tackification of said surfaces to facilitate bonding thereof;

assembling a plurality of said treated sheets to form a laminate wherein said laminate is composed entirely of the starch component; and allowing said assembled sheets to cure wherein said sheets are bonded one to the other.

2. The method as set forth in claim 1 and further including cutting said laminate into structured packing configurations.

3. The method as set forth in claim 1 wherein said step of assembling said sheets includes the step of compressing said sheets together to enhance bonding therebetween.

4. The method as set forth in claim 1 and including the step of selecting said starch component from the group consisting of unmodified and modified corn, potato, wheat, rice, tapioca, waxy maize and high amylose corn starch.

5. The method as set forth in claim 4 and including the step of modifying said starch with an alkylene oxide containing 2 to 6 carbon atoms.

* * * * *